April 23, 1940. R. J. BURKE 2,198,509
PNEUMATICALLY SUPPORTED MINIATURE AIRCRAFT
Original Filed March 29, 1937 3 Sheets-Sheet 1

INVENTOR
RICHARD J. BURKE
BY
ATTORNEY.

April 23, 1940.   R. J. BURKE   2,198,509
PNEUMATICALLY SUPPORTED MINIATURE AIRCRAFT
Original Filed March 29, 1937   3 Sheets-Sheet 2

INVENTOR
RICHARD J. BURKE
BY
Stuart M. Mauee
ATTORNEY.

April 23, 1940.  R. J. BURKE  2,198,509
PNEUMATICALLY SUPPORTED MINIATURE AIRCRAFT
Original Filed March 29, 1937  3 Sheets-Sheet 3
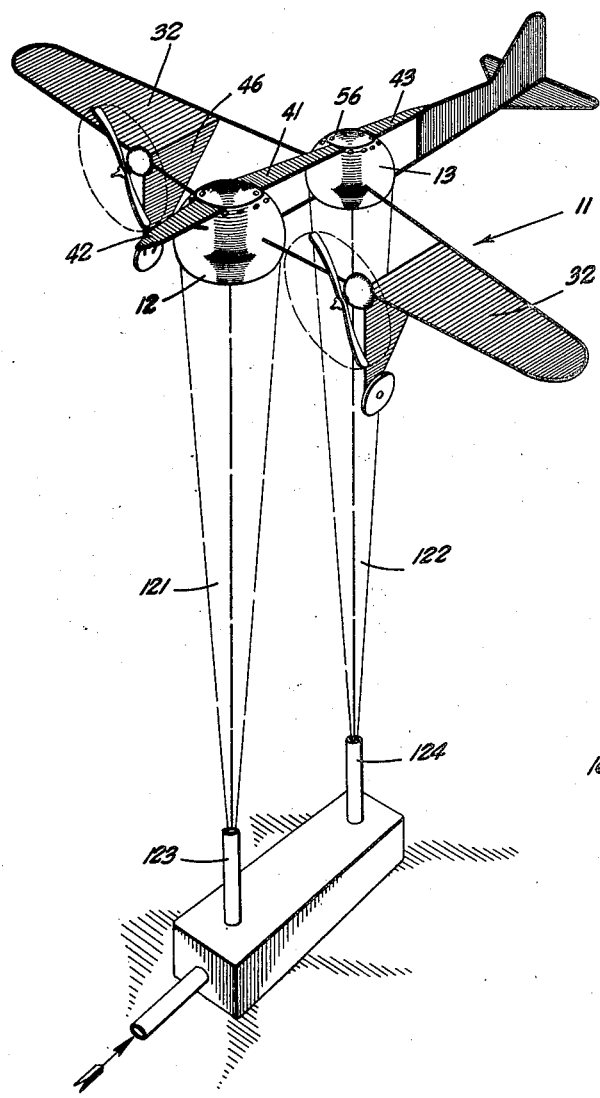
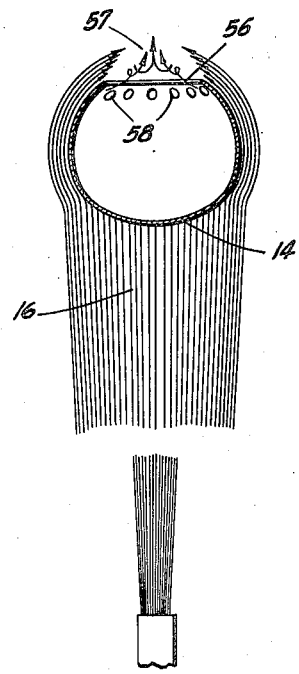
INVENTOR
RICHARD J. BURKE
BY
ATTORNEY.

Patented Apr. 23, 1940

2,198,509

UNITED STATES PATENT OFFICE 2,198,509

PNEUMATICALLY SUPPORTED MINIATURE AIRCRAFT

Richard J. Burke, Altadena, Calif.

Application March 29, 1937, Serial No. 133,617
Renewed August 8, 1939

22 Claims. (Cl. 46—76)

This invention relates to educational and display devices, toys and scientific apparatus and more particularly to apparatus falling within any one of these classifications and in which a heavier-than-air object is supported in and by an upwardly directed jet of fluid.

An object of the present invention is to provide improvements in the physical characteristics of pneumatically supported bodies of the general character indicated whereby are attained higher lift of a body of given size and weight by a jet of given volume and velocity, greater stability of the body while supported within and by the jet, and a greater degree of maneuverability of the jet-supported body. The present invention, therefore, represents an improvement over those forming the respective subjects matter of co-pending applications Serial No. 671,487, filed May 17, 1933, by myself, and Serial No. 12,600, filed March 23, 1935, by M. L. Burke and myself.

A more detailed object is to incorporate the improved type of jet-supported object into the construction of a miniature aircraft, similar preferably to one or more of those described in application Serial No. 12,600 aforesaid, but the flying qualities of which are improved by reason of the greater efficiency of the jet-supported object forming a portion thereof.

A further object of the present invention is to improve various other details of the construction of the miniature aircraft whereby not only are its flying qualities definitely improved, but the degree of accuracy with which it simulates the appearance of an actual aircraft is materially enhanced.

The invention possesses other objects and features of advantage, some of which, with the foregoing, will be set forth in the following description of the preferred forms of my invention which are illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings:

Fig. 8 is a perspective view of the miniature aircraft Fig. 1, showing as actually supported by jets of air from co-operating nozzles.

Fig. 9 is a diagrammatic view to be used in conjunction with the following description of the manner in which the fluid from the jets flows around and supports the spheres which form a portion of the miniature aircraft of the present invention.

In terms of broad inclusion, the present invention contemplates the provision of various details of refinement in a body simulating in miniature an actual aircraft, which body is supported in midair through the expedient of one or more jets of fluid, preferably invisible, so as to create the illusion of actual flight of a model aircraft. These details of refinement include the shape of the substantially spherical body or bodies which are engaged by the jets in order to effect support of the miniature aircraft thereby, structural details of these bodies such as making them hollow with an opening at the top, the provision of foramina in the walls of the body encircling the hole, a jet-engaging strip interconnecting the plurality of spherical bodies at their upper portions, and other refinements which add to the efficiency of the device as a jet-supported body as well as enhance the exactitude of its simulation of an actual aircraft.

Figure 1:
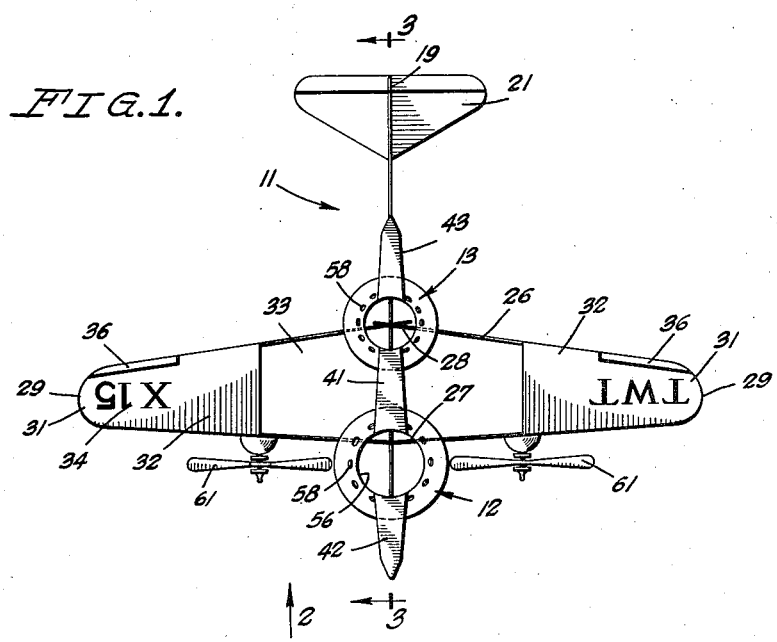
Fig. 1 is a top plan view of a miniature aircraft incorporating the principles of the present invention.
Figure 2:
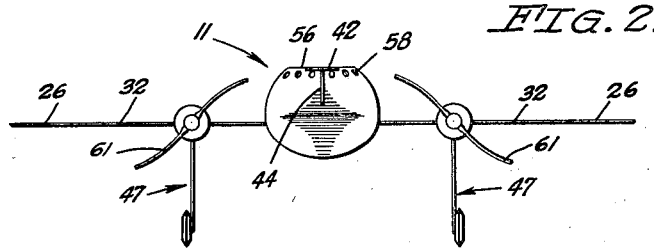
Fig. 2 is a view in front elevation taken in the direction of the arrow 2 of Fig. 1.
Figure 3:
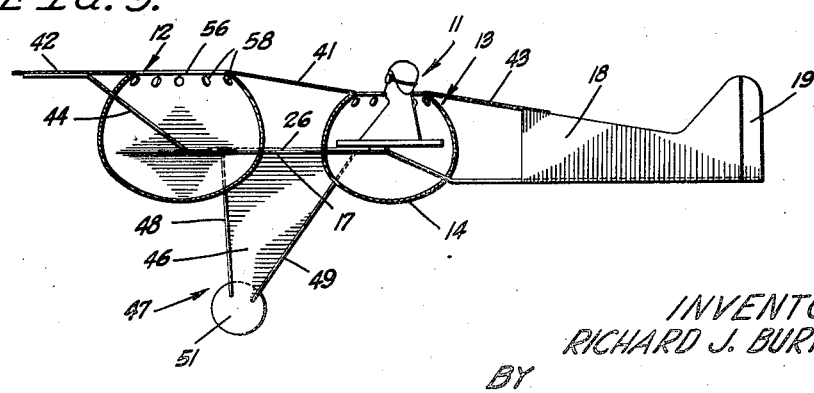
Fig. 3 is a longitudinal, medial, vertical sectional view the plane of section being indicated by the line 3—3 of Fig. 1 and the direction of view by the arrows.

Figs. 1 to 3, inclusive, illustrate one form of miniature aircraft which is a stimulation of a monoplane of modern design. The body portion of this miniature aircraft 11 is in the form of preferably two spherical bodies 12 and 13 representing the fuselage of an actual airplane. Whereas these spheres may be of any suitable material, within the scope of the present invention, they preferably are very thin and light in weight and yet possessed of sufficient strength and rigidity to withstand relatively hard usage, such as dropping upon a hard surface from an elevation of three or four feet. I have found it entirely satisfactory to construct these spheres of various self-hardening materials such as aluminum-bronze paint sprayed upon a suitable core, which core is composed of material having a relatively low melting point so that after the paint has set and hardened the core can be melted out leaving the hollow sphere.

In my said co-pending applications the body engaged by the jets to support the miniature aircraft has been described as being of spherical configuration. The present invention represents an improvement over the respective subjects matter of the said co-pending applications in that instead of being truly spherical in configuration each of the bodies 12, 13 is an oblate-spheroid, inasmuch as it is flattened somewhat at its bottom 14, as best shown upon Fig. 9. Thus each of the bodies 12, 13 presents a broadened and more nearly flat surface against which the upwardly flowing jet 16 impinges and, because of its being more nearly flat, a greater lifting effort is imposed by the jet upon the body. It has been found by actual experimentation that, other conditions being equal, a ball of oblate-spheroid form as described will be lifted from twenty to thirty percent higher than one of truly spherical form.

The miniature aircraft of Figs. 1 to 3 include two such oblate-spheroidal bodies as stated. These are joined and retained in predetermined spaced position by means of a wire framework consisting of longitudinal members 17 which preferably are extended aft of the rearmost body 13, to support a vane 18 disposed in vertical position and the conformation of which is such that it simulates the after position of the empennage. At its extreme after end this vane 18 is provided with an upwardly projecting portion 19 which simulates the vertical rudder of the actual aircraft. A horizontally extending vane 21 is cemented or otherwise permanently attached under and adjacent the after end of the vane 18 in simulation of the horizontal rudder of the actual aircraft, this horizontal vane 21 being of suitable shape to make the simulation as nearly exact as possible under the circumstances.

Additional wires 26 extend laterally from the longitudinal member 17, each of these wires 26 preferably being in the form of a loop, each end 27, 28 of which is disposed inside of one of the bodies 12, 13 respectively, and the bight 29 of which is disposed far enough from the longitudinal axis of the miniature aircraft to support the outer portion or tip 31 of the wing 32, which is provided by a vane interconnecting the legs of the wires 26. These wings 32, however, do not extend all the way from the tip 31 to the bodies 12, 13, a space 33 being left between the wings and the bodies of sufficient size to leave the wings substantially clear of the jet 16 when the miniature aircraft is supported by jets, inasmuch as it is desired that the fluid of the jets engage the spheroidal bodies only. It has been found by experimentation that the stability of the miniature aircraft in the supporting jets is greatly diminished when the jets are permitted to engage any material extent of the area of the wings.

In order to enhance still further the degree of exactitude of simulation, I prefer to make appropriate letters and/or numbers 34 on the wing surfaces and to mark out areas 36 simulating the ailerons.

Another detail of refinement which adds materially to the efficiency of lift and stability of the aircraft while supported in jets is a flat strip or vane 41 lying in a substantially horizontal plane and interconnecting the bodies or balls 12, 13 at the upper portions thereof. Similar strips 42 and 43, respectively, may extend forward from the forward ball 12 and aft from the after ball 13. Preferably if such a forwardly extending strip 42 be employed, it is braced by an extension 44 of the longitudinally extending wire 17; and the after end of the strip 43 is supported upon the upper edge of the vane 18 which represents the empennage. This strip being disposed above the respective centers of gravity of the balls 12, 13, and hence being engaged by that portion of the jets which have already passed the centers of gravity, it has a decided stabilizing effect because they act, it is believed, more or less like a conventional drag. However, by disposing them so that they present a flat surface to the streams of the jets instead of merely a thin edge as in the case of a conventional rudder, they add to a very material degree to the lifting power of the jets and thus cause the miniature aircraft to be held at a considerably greater elevation by jets of given volume and velocity.

Another stabilizing detail is a vane 46 which is provided upon each of the landing gears 47, which extends vertically downward from the inner edge of each of the wing surfaces 32. These vertically extending vanes 46 simulate in appearance the fairing spoken of in the trade as landing gear "pants." Whereas they are disposed far enough laterally from the balls 12 and 13 to lie outside the most rapidly moving portion of the jets, they are engaged by a sufficient quantity of the upwardly moving air to add still further to the stability, inasmuch as they are of material area and lie in planes parallel to the direction of flow. Each of these landing gears 47 is in the form of a pair of wires 48, 49 extending downwardly from the forward and after edges respectively of the associated wing and supporting at their lower ends a relatively heavy disc 51 which simulates the wheel of a conventional landing gear. This wheel-simulating weight 51 adds still more to the stability of the model aircraft by lowering its center of gravity.

Whereas the balls forming the body portion of the miniature aircraft of my aforesaid co-pending applications are of spherical form and substantially uninterrupted throughout their entire surface, I have found that another structural detail which enhances the efficiency of a jet in lifting such a body is provided by making each of these balls hollow and providing a relatively large opening 56 at the top, i. e., at that surface thereof which is diametrically opposite the flattened portion 14. It is well known that when an air stream passes a body of any material width, an area of low pressure or "burble" 57 (see Fig. 9) is developed on that side of the body which is away from the direction of flow of the air stream. I have found that by providing the opening 56 at that portion of the ball where the burble 57 forms, both the lift and stability of the lifted ball are greatly enhanced. Whereas the reason for this is not definitely known, it is presumed that the low pressure which forms in the burble is permitted to enter the hollow ball, forming a partial vacuum throughout its entire interior, thus not only decreasing the weight of the air within the ball but also presenting a greatly enlarged surface upon which the low pressure can act. It is also found that the lift and stability are benefitted by providing a row of small foramina 58 in the walls of the ball surrounding the hole 56, presumably for the same reason.

Upon the forward edge of each of the wings 32 a miniature propeller 61 is provided. Each of these propellers 61 is preferably formed of a piece of wire flattened on its outer edges, such flattening however being parallel to the axis of rotation of the propeller 61, instead of at an angle to the axis, as in the case of the conventional propeller. The miniature propellers 61 are so positioned that as they rotate they just miss the forward ball 12. Moreover they lie in the horizontal medial plane of this ball 12, the result being that the inner end of each miniature propeller 61 enters the upwardly flowing air jet in which the miniature aircraft is supported, which of course causes the propellers 61 to rotate at a speed so great that they not only look very much like the driving propellers of a conventional aircraft, but they also add to a material degree to the stability of the pneumatically supported miniature aircraft because of the gyroscopic action which they set up. Preferably each end of each propeller 61 is deflected slightly, the direction of deflection being opposite to the direction in which that end rotates.

Figure 4:
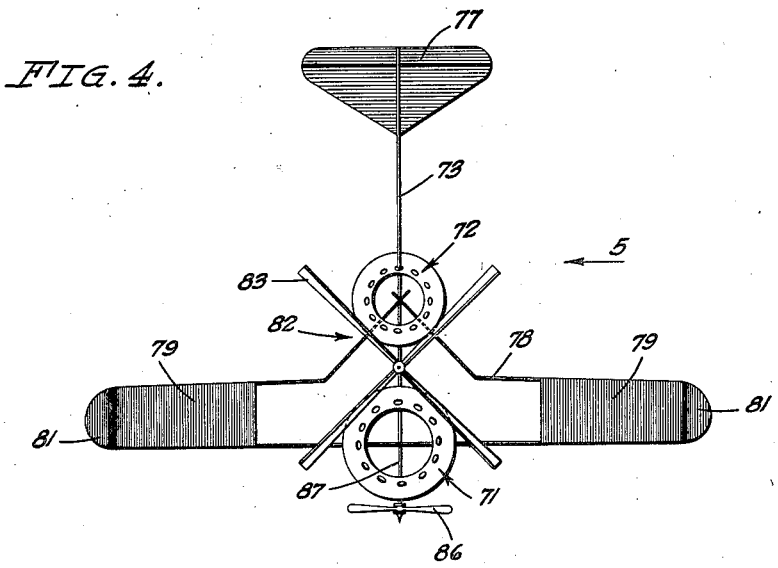
Fig. 4 is a view similar to Fig. 1 but showing a modified form of my invention wherein the miniature aircraft simulates in appearance an autogiro.
Figure 5:
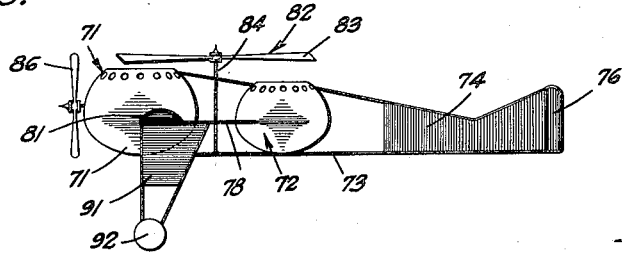
Fig. 5 is a view in side elevation, the direction of view being indicated by the arrow 5 of Fig. 4.
Figure 6:
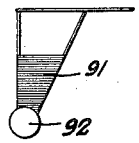
Fig. 6 is a detail view showing a slightly modified form of landing gear adapted for use upon either of the miniature aircraft illustrated in Figs. 1 or 4, and wherein the fairing is disposed in slightly altered arrangement.
Figure 7:
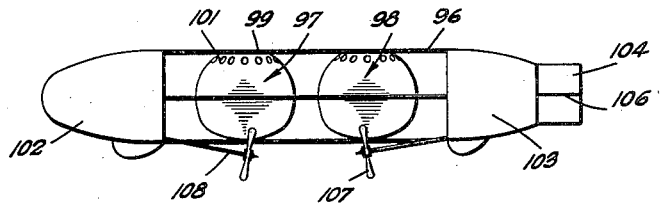
Fig. 7 is a view in side elevation of a still further modified form of miniature aircraft, incorporating the principles of the present invention and simulating in appearance a dirigible.

Figs. 4 and 5 show a slightly modified form of miniature aircraft which however also incorporates the principles of the present invention inasmuch as the portion representing the fuselage is here again represented by a pair of hollow balls 71 and 72, similar in shape, size and structural details to the balls 12 and 13 previously described. It should be observed that in both these modifications the forward ball 12 or 71, as the case may be, is considerably larger than the after ball 13, 72. The balls 71 and 72 are supported upon longerons 73, the after end of which supports a vertical vane 74, a vertical rudder 76, and a horizontal rudder 77. Longitudinally extending wire frames 78 support wings 79, the tips 81 of which are deflected slightly. Inasmuch as this modification is a simulation of an autogyro, it is provided with a rotor 82 in the form of four blades 83 mounted for rotation upon a vertically extending rod 84 which is secured to the longerons 73. These blades 83 are given sufficient pitch to cause the rotor 82 to rotate as it is engaged by the upwardly directed jet or jets in which the miniature craft is supported. In this modification a single propeller 86 is provided, this being revolubly mounted at the forward face of the forward blade 71, its support being provided by a horizontally extending rod 87 which extends through the forward wall of the blade 71 to be engaged with one or more of the wires 78 or 73. It should be observed that each of the wings 79 terminates at its inner end at a material distance from the blades 71, 72 as in the case of the previously described modification, and that miniature landing gears 91 extend downwardly from the inner edges of the wing 79. These landing gears 91 are similar to those previously described in connection with the modification of Figs. 1 to 3, having a weight 92 at the lower end of each which simulates in appearance a conventional landing wheel. Fairing also is provided upon these landing gears. In some instances, however, it may not be necessary to provide the fairing throughout the entire vertical length of the landing gear—Fig. 5 shows the fairing extending from the tip of the landing gear throughout substantially two-thirds of the length toward the wheel 92, whereas the modification shown in Fig. 6 shows the fairing as extending upwards from the wheel 92 substantially two-thirds of the way to the wings. Fig. 7 illustrates another modification of the present invention in the form of a miniature dirigible consisting of a wire frame 96 holding two spaced balls 97 and 98 intermediate the end of the frame 96, each of these balls preferably being of oblatespheroid form, as in the case of modifications previously described, and having an opening 99 at the top of each and preferably a row of foramina 101 surrounding the opening 99. At the ends of the frame 96 nose and tail caps 102, 103 respectively are provided, and starting and elevating rotors 104 and 106 respectively are also provided upon the after end of the tail cap 103 in simulation of the corresponding elements carried by a conventional, full-size dirigible. Propellers 107 mounted upon obliquely extending rods 108 are positioned upon preferably both sides of both blades 97 and 98, these propellers being similar in design to the propellers 61 previously described, being flattened on their ends and being positioned substantially in the transverse medial plane of the associated blade so that the inner end of each propeller is engaged by the upwardly flowing fluid of the supporting jet and thus caused to rotate at high speed.

Thus it may be seen that I have provided various details of refinement which add materially to the efficiency of the device, it being supported in upwardly directed fluid jets thus causing the miniature aircraft to be supported at a greater elevation, other conditions being equal. The manner in which the aircraft is supported is indicated upon Fig. 8, which shows the aircraft 11 supported by air jets 121, 122 issuing from nozzles 123, 124 respectively. The aircraft 11 is so positioned that the center spacing of the balls 12 and 13 corresponds substantially to the spacing between the axes of the nozzles 123, 124. The nozzles preferably are of such design that the air streams 121, 122 issuing therefrom are relatively slender, so that they can pass between the wings 32 without any material quantity of the fluid impinging against the wings. The oblate-spheroidal shape of the balls 12, 13 and the substantially horizontally extending strips 41, 42 and 43 add materially to the lift, causing the device to be supported at a greater elevation and also contributing toward this same end is a hole 56 provided in the upper side of each ball. This hole also contributes, it is believed, to the greater stability of the miniature air craft while thus supported, as does also the fairing 46 upon the miniature landing gear. So greatly is the stability of the pneumatically supported body enhanced by these details that the maneuverability of the aircraft hereinabove described is far superior to that of the aircraft described in my co-pending applications aforesaid, these details being of great importance inasmuch as the device is intended for use in apparatus where the nozzles are movable to effect the simulation of actual flight of the miniature aircraft, it being understood that the miniature aircraft moves about in accordance with the manipulation of the nozzles. I find that when the hereinabove described details are employed the nozzles may be moved much more rapidly without dislodging the miniature aircraft from the jet in which it is supported.

I claim:

1. In combination, means providing an upwardly directed fluid jet and a miniature aircraft adapted to be supported by said jet comprising a skeleton frame comprising interconnected longitudinal and transverse members, wing-simulating means carried by said transverse member, tail-simulating means carried by said longitudinal member, and a body portion for supporting said miniature aircraft by engagement within said jet, said body portion being of oblate spheroid form with its major axis disposed substantially parallel to the direction of flow of said jet.

2. In combination, means providing an upwardly directed fluid jet and a miniature aircraft adapted to be supported by said jet comprising a skeleton frame comprising interconnected longitudinal and transverse members, wing-simulating means carried by said transverse member, tail-simulating means carried by said longitudinal member, and a body portion for supporting said miniature aircraft by engagement within said jet, said body portion being of oblate spheroid form with its major axis disposed substantially perpendicular to the plane of said frame.

3. In combination, means providing an upwardly directed fluid jet and a miniature aircraft adapted to be supported by said jet comprising a body portion for supporting said aircraft by engagement within said jet, said body portion being of oblate spheroid form with its axis disposed substantially parallel to the direction of flow of said jet.

4. In combination, means providing an upwardly directed fluid jet and a miniature aircraft adapted to be supported by said jet comprising a body portion for supporting said aircraft by engagement within said jet, said body portion being of oblate spheroid form with its axis disposed substantially parallel to the direction of flow of said jet and being hollow with an opening therein at that end of said axis remote from the orifice from which said jet issues.

5. In combination, means providing an upwardly directed fluid jet and a miniature aircraft adapted to be supported by said jet comprising a body portion for supporting said aircraft by engagement within said jet, said body portion being of oblate spheroid form with its axis disposed substantially parallel to the direction of flow of said jet and being hollow with an opening therein at that end of said axis remote from the orifice from which said jet issues, and said body portion having a row of holes therein surrounding and spaced slightly from the edge of said opening.

6. In combination, means providing an upwardly directed fluid jet and a miniature aircraft adapted to be supported by said jet comprising a framework, means carried by said framework simulating supporting and controlling elements of an actual aircraft, a spheroidal body mounted on said frame for supporting said body by engagement within said jet, and a propeller-simulating rotor comprising a plurality of arms pivoted to said frame in position to rotate with the ends of said arms passing sufficiently close to said body to enter the low pressure portion of said jet adjacent to said body.

7. In combination, means providing an upwardly directed fluid jet and a miniature aircraft adapted to be supported by said jet comprising a framework, means carried by said framework simulating supporting and controlling elements of an actual aircraft, a spheroidal body mounted on said frame for supporting said body by engagement within said jet, and a propeller-simulating rotor comprising a plurality of arms pivoted to said frame in position to rotate with the ends of said arms passing sufficiently close to said body to enter the low pressure portion of said jet adjacent to said body, and substantially in the transverse, vertical, medial plane of said body.

8. In combination, means providing an upwardly directed fluid jet and a miniature aircraft adapted to be supported by said jet comprising a framework, means carried by said framework simulating supporting and controlling elements of an actual aircraft, a spheroidal body mounted on said frame for supporting said body by engagement within said jet, and a propeller-simulating rotor comprising a plurality of arms pivoted to said frame in position to rotate with the ends of said arms passing sufficiently close to said body to enter the low pressure portion of said jet adjacent to said body, and substantially in the transverse, vertical, medial plane of said body, each of said arms being flattened at its end to present a greater area to said jet.

9. In combination, means providing an upwardly directed fluid jet and a miniature aircraft adapted to be supported by said jet comprising a frame, means on said frame for supporting said miniature aircraft by engagement within said jet, struts extending downwards from said frame and wheels carried at the lower ends of said struts in simulation of the landing gear of an actual aircraft, and substantially vertical stabilizing vanes carried by said struts and simulating the fairing covering the landing gear of an actual aircraft.

10. In combination, means providing an upwardly directed fluid jet and a miniature aircraft adapted to be supported by a jet of fluid, a frame, means on said frame for supporting said miniature aircraft by engagement within said jet, struts extending downwards from said frame and wheels carried at the lower ends of said struts in simulation of the landing gear of an actual aircraft, and substantially vertical stabilizing vanes carried by said struts and simulating the fairing covering the landing gear of an actual aircraft, said struts being spaced outwards from said supporting means to dispose said vanes adjacent the outer, less rapidly moving portions of said jet.

11. In a miniature aircraft adapted to be supported in two spaced, upwardly directed jets of fluid, a frame and a pair of oblate spheroidal bodies mounted in said frame to support said miniature aircraft by engagement of each of said bodies in one of said jets.

12. In a miniature aircraft adapted to be supported in two spaced, upwardly directed jets of fluid, a frame and a pair of oblate spheroidal bodies mounted in said frame to support said miniature aircraft by engagement of each of said bodies in one of said jets, the axis of each of said bodies being substantially parallel to the direction of flow of the associated jet.

13. In a miniature aircraft adapted to be supported in two spaced, upwardly directed jets of fluid, a frame and a pair of oblate spheroidal bodies mounted in said frame to support said miniature aircraft by engagement of each of said bodies in one of said jets, the axis of each of said bodies being substantially parallel to the direction of flow of the associated jet, and each of said bodies being hollow with an opening therein at that end of its axis remote from the orifice from which said jet issues.

14. In a miniature aircraft adapted to be supported in two spaced, upwardly directed jets of fluid, a frame and a pair of oblate spheroidal bodies mounted in said frame to support said miniature aircraft by engagement of each of said bodies in one of said jets, the axis of each of said bodies being substantially parallel to the direction of flow of the associated jet, and each of said bodies being hollow with an opening therein at that end of its axis remote from the orifice from which said jet issues, and each of said bodies having a row of holes therein surrounding and spaced slightly from the edge of said opening.

15. In a miniature aircraft adapted to be supported in two spaced, upwardly directed jets of fluid, a frame, a pair of oblate spheroidal bodies mounted in said frame to support said miniature aircraft by engagement of each of said bodies in one of said jets, the axis of each of said bodies being substantially parallel to the direction of flow of the associated jet, each of said bodies being hollow with an opening therein at that end of its axis remote from the orifice from which said jet issues, and a substantially horizontal flat strip extending outwards from adjacent the edge of said opening in each of said bodies.

16. In a miniature aircraft adapted to be supported in two spaced, upwardly directed jets of fluid, a frame, a pair of oblate spheroidal bodies mounted on said frame to support said miniature aircraft by engagement of each of said bodies in one of said jets, and a substantially horizontal flat strip interconnecting the upper portion of said bodies.

17. In a miniature aircraft adapted to be supported in two spaced, upwardly directed jets of fluid, a frame, a pair of oblate spheroidal bodies mounted on said frame to support said miniature aircraft by engagement of each of said bodies in one of said jets, a substantially horizontal flat strip interconnecting the upper portion of said bodies, and a substantially horizontal flat strip extending longitudinally with respect to said miniature aircraft and from the upper portion of at least one of said bodies toward the associated end of said miniature aircraft.

18. In a miniature aircraft adapted to be supported in two spaced, upwardly directed jets of fluid, a frame, and a pair of oblate spheroidal bodies mounted on said frame to support said miniature aircraft by engagement of each of said bodies in one of said jets, said bodies being of different size with the larger disposed forward of the smaller.

19. In combination, means providing a plurality of upwardly directed fluid jets, and a miniature dirigible adapted to be supported in said jets comprising a frame, means at the ends of said frame simulating the ends of the envelope of an actual dirigible, and a plurality of bodies mounted on said frame for supporting said miniature dirigible by engagement of each of said bodies in one of said jets, each of said bodies being of oblate-spheroidal form with its axis disposed substantially parallel to the direction of flow of the associated jet.

20. In combination, means providing a plurality of upwardly directed fluid jets, and a miniature auto-gyro adapted to be supported in said jets comprising a frame, means carried by said frame simulating the wings and rudder of an actual auto-gyro, and a plurality of bodies mounted on said frame for supporting said miniature auto-gyro by engagement of each of said bodies in one of said jets, each of said bodies being of oblate-spheroidal form with its axis disposed substantially parallel to the direction of flow of the associated jet.

21. In combination, means providing an upwardly directed fluid jet, and a miniature aircraft adapted to be supported therein, comprising a substantially spherical body portion for supporting said aircraft by engagement within said jet, said body portion being hollow and having an opening therein on that side of said body remote from the orifice from which said jet issues.

22. In combination, means providing an upwardly directed fluid jet, and a miniature aircraft adapted to be supported therein, comprising a substantially spherical body portion for supporting said aircraft by engagement within said jet, said body portion being hollow and having an opening therein on that side of said body remote from the orifice from which said jet issues, and said body portion having a row of holes therein surrounding and spaced slightly from the edge of said opening.

RICHARD J. BURKE.